United States Patent [19]
Watanabe et al.

[11] Patent Number: 5,341,072
[45] Date of Patent: Aug. 23, 1994

[54] BI-DIRECTIONAL SCAN CIRCUIT

[75] Inventors: Junzo Watanabe, Kanagawa; Akihiro Ueyama, Tokyo; Ban Kawamura, Kanagawa, all of Japan

[73] Assignee: Sony Corporation, Tokyo, Japan

[21] Appl. No.: 77,751

[22] Filed: Jun. 18, 1993

[30] Foreign Application Priority Data

Jun. 22, 1992 [JP] Japan .................................. 4-187558
Jun. 22, 1992 [JP] Japan .................................. 4-187559
Jun. 23, 1992 [JP] Japan .................................. 4-190081

[51] Int. Cl.$^5$ ........................ H01J 29/70; H01J 29/76
[52] U.S. Cl. ................................................ 315/408
[58] Field of Search ....................... 315/408, 399, 370

[56] References Cited

U.S. PATENT DOCUMENTS

| | | |
|---|---|---|
| 4,035,841 | 7/1977 | Micek . |
| 4,674,449 | 6/1987 | Kraus et al. .......................... 358/148 |
| 4,719,394 | 1/1988 | Watanuki .............................. 315/408 |
| 4,956,585 | 9/1990 | Rilly . |
| 5,051,668 | 9/1991 | Kawaberi et al. .................... 315/408 |

FOREIGN PATENT DOCUMENTS

| | | | |
|---|---|---|---|
| 0175409 | 3/1986 | European Pat. Off. ........ | H04N 3/30 |
| 0141256 | 5/1986 | European Pat. Off. ........ | G09G 1/04 |
| 8807799 | 10/1988 | PCT Int'l Appl. ............ | H04B 3/30 |

*Primary Examiner*—Theodore M. Blum
*Attorney, Agent, or Firm*—Lewis H. Eslinger; Jay H. Maioli

[57] ABSTRACT

At a horizontal deflecting circuit of bi-directional deflection, timings of deflection of forward scan path and backward scan path are respectively controlled. The timing of deflection of forward path or backward path is controlled at the first timing control circuit 22 so that it is synchronized with the horizontal synchronizing signal HD and timing of deflection of backward path or forward path is controlled at the second timing control circuit 24 so that deflection cycles of forward path and backward path are equalized.

Further, timings of deflection of forward scan path and backward scan path are controlled respectively at first and second phase comparison circuits 22 and 24 so that the relation in phase between the image signal and the deflection takes a constant value on the basis of the horizontal synchronizing signal, to previously prevent occurrence of steady phase error.

12 Claims, 12 Drawing Sheets

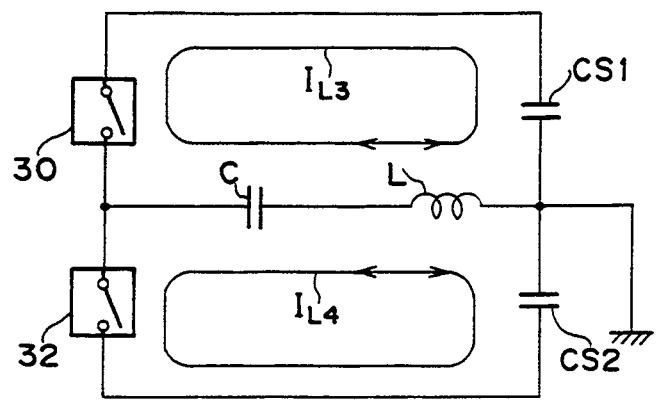
FIG. 4
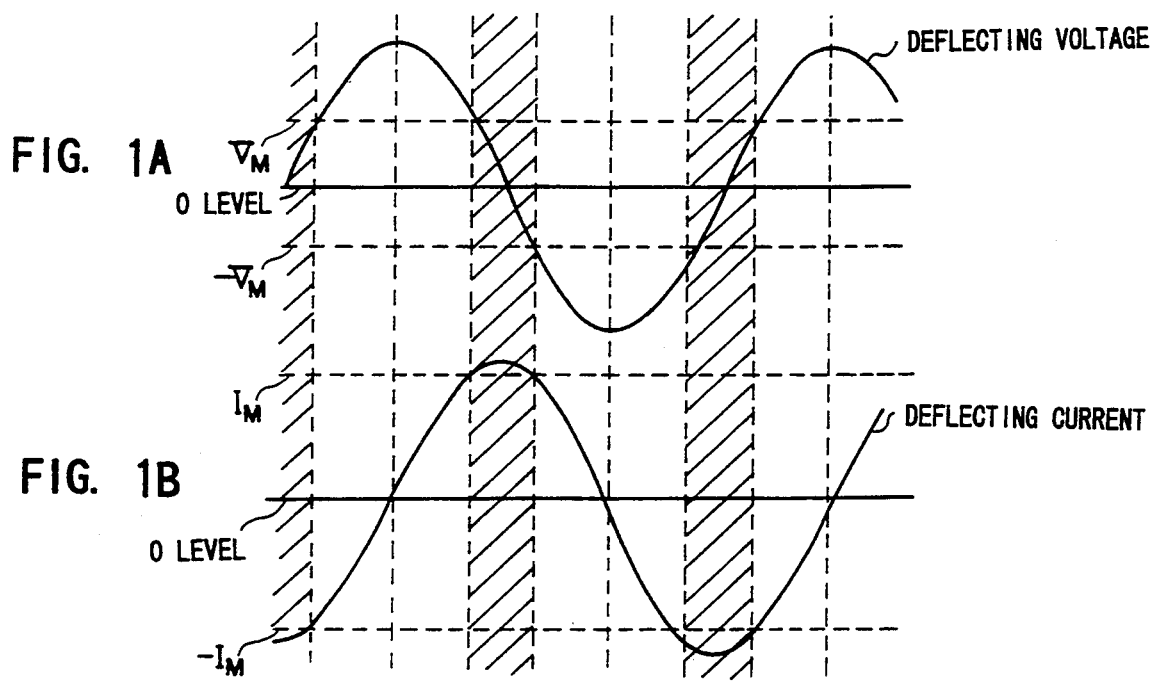

FIG. 5A
FIG. 5B
FIG. 5C
FIG. 5D
FIG. 5E
FIG. 5F
FIG. 5G
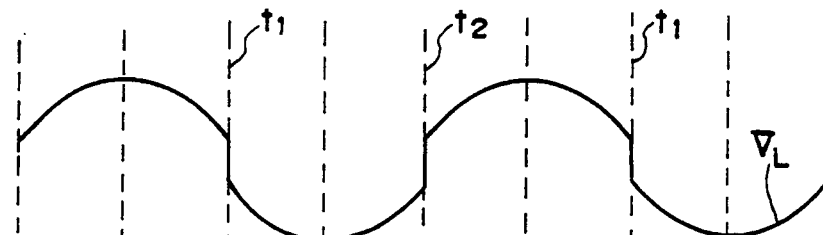
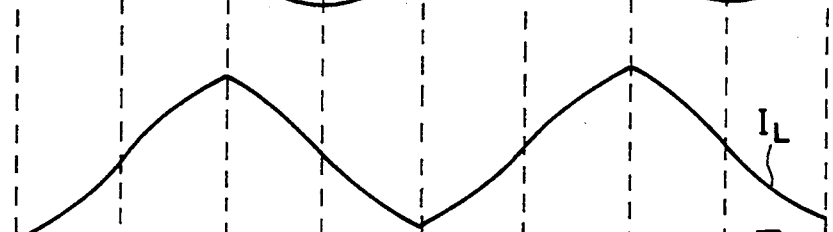
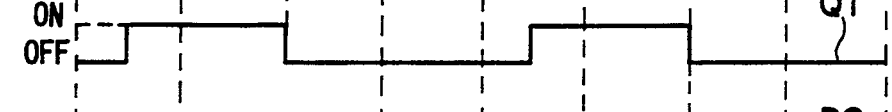
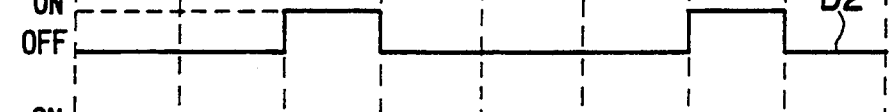
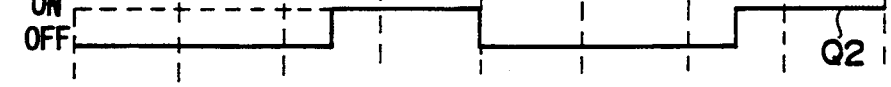

BI-DIRECTIONAL SCAN CIRCUIT

BACKGROUND OF THE INVENTION

1. Field of the Invention

This invention relates to a bi-directional scan circuit, and is particularly applicable to a horizontal deflecting circuit of bi-directional deflection.

2. Description of the Related Art

With respect to this type of deflecting circuits, there has been proposed a deflecting circuit (hereinafter referred to deflecting circuit of bi-directional deflection) in which a horizontal deflecting coil is driven by using a drive signal, the signal level of which before and after a predetermined point in time changes symmetrically with respect to such point in time as a sine wave (U.S. Pat. No. 4,672,449).

In accordance with the bi-directional deflecting circuit, it is possible to form a display image by both scanning from the left to the right on a screen (hereinafter referred to scanning of forward path) and scanning in the opposite direction thereof from the right to the left on the screen (hereinafter referred to scanning of backward path). It is also possible to reduce the deflecting frequency to ½.

Further, since it is possible to prevent an abrupt change in the deflecting current such as a sawtooth signal, an unnecessary radiation or the like can be reduced and a load on the deflecting circuit element can be reduced.

Specifically, if the deflecting circuit is composed of a resonance circuit to drive a deflecting coil by a sine wave as shown in FIGS. 1A and 1B, the electric power necessary for deflection can be reduced by a simple construction (U.S. Pat. No. 5,051,668).

There is a problem, however, in this type of bi-directional deflecting circuit that an AFC circuit for raster scanning is not applicable thereto.

Specifically, in a conventional horizontal deflecting circuit based on the conventional raster scanning, after generating a sawtooth signal from flyback pulse, the result of phase comparison between such sawtooth signal and the horizontal synchronizing signal is obtained by a phase comparator, the phase comparison result being fed back to a horizontal oscillation circuit.

Thereby, in the conventional horizontal deflecting circuit, the horizontal oscillation frequency is controlled on the basis of the horizontal synchronizing signal to form an AFC circuit.

On the other hand, in a bi-directional deflecting circuit, display images are formed by forward path and backward path. Thus, even a simple shift in the phase of horizontal deflection results in the display images of forward path and backward path which are displayed at different positions.

In this case, in raster scanning, while the display position of the display image is simply shifted on displaying, the display image in bi-directional deflection is displayed as an overlapped image or, if the shift is relatively smaller, resolution in the horizontal direction is degraded.

Further, in raster scanning, picture quality of the display image is not specifically affected even if retrace time is changed due to variance in circuit elements. On the other hand, in bi-directional deflection, the display images of forward path and backward path are displayed in different positions also in this case, resulting in degradation of picture quality of the display image.

In view of the above points, the present invention has been made to propose a deflecting circuit which can be suitably used in bi-directional deflection to form a display image in synchronization with a horizontal synchronizing signal and to previously prevent degradation in picture quality of the display image.

In addition, in a conventional AFC circuit, a control voltage for controlling the horizontal oscillation frequency is generated at the phase comparator to drive the horizontal deflecting circuit in a manner following the frequency change of the horizontal synchronizing signal.

Accordingly, as a consequence of change in the control voltage corresponding to the frequency change of the horizontal synchronizing signal, a steady phase error corresponding to the amount of the change occurs at the phase comparator in this type of AFC circuit when the frequency of the horizontal synchronizing signal is changed.

There is a problem that such steady phase error results in a shift in the horizontal position of a display image, where the image center in the horizontal direction must be readjusted every time when a shift occurs in the horizontal synchronizing frequency.

Further, the steady phase error could be changed by a change in temperature, where the display image would be horizontally shifted in position following an ambient temperature change.

Particularly, in a bi-directional deflecting circuit, if the display images of forward path and backward path are displayed in a manner shifted in the opposite directions from each other due to such steady phase error, a problem occurs that the display image is displayed as an overlapped image or that, if the shift is relatively smaller, resolution is degraded.

In view of the above points, the present invention has been made to propose a deflecting circuit in which a horizontal shift in displayed image-may be prevented even if the horizontal synchronizing frequency is changed when it is used in bi-directional deflection.

SUMMARY OF THE INVENTION

To solve such problems, in accordance with a first aspect of the invention, a bi-directional deflecting circuit 18 is provided for supplying deflecting currents $I_{L3}$ and $I_{L4}$ of forward path and backward path to a horizontal deflecting coil L so as to form display images respectively by deflections of the forward path and the backward path, wherein: timing of deflection of forward path and backward path are controlled at a first timing control circuit 22 and a second timing control circuit 24 and the display position in the display images of forward path and backward path are matched.

Further, in accordance with a second aspect of the invention, a first resonance circuit for supplying the deflecting current $I_{L3}$ in forward path and a second resonance circuit for supplying the deflecting current $I_{L4}$ are provided. The first and second timing control circuits 22 and 24 supply deflecting currents $I_{L3}$ and $I_{L4}$ of the forward path and the backward path to the horizontal deflecting coil L by switching the first and second resonance circuits to connect them to the horizontal deflecting coil L, and changes timing for changing over of the first and second resonance circuits to control timings of deflection of forward path and backward path.

Furthermore, in accordance with a third aspect of the invention, the first and second timing control circuits 22 and 24 control timings of deflection of forward path and backward path on the basis of the phase comparison result S4 between the terminal voltage $V_L$ of the horizontal deflecting coil L and the horizontal synchronizing signal HD.

Furthermore, in accordance with a fourth aspect of the invention, the first resonance circuit is formed by a serial resonance circuit consisting of a first switch circuit 30, a resonance capacitor C, a horizontal deflecting coil L and a first S-correction capacitor CS1, and the second resonance circuit is composed of a serial resonance circuit consisting of a second switch circuit 32, the resonance capacitor C, the horizontal deflecting coil L, and second S-correction capacitor CS2, the first and second phase control circuits 22 and 24 complementarily changing over the first and second switch circuits 30 and 32 so as to control the switching timing to control timings of deflection of forward path and backward path.

In the above constitution, the bi-directional deflecting circuit 18 for supplying the deflection currents $I_{L3}$ and $I_{L4}$ of the forward path and the backward path control timings of deflection of respectively the forward path and backward path by the first and second timing control circuits 22 and 24. Thus, the display position of the display image in forward path and backward path can be matched easily.

Moreover, the first and second resonance circuit are switched to connect the horizontal deflecting coil L, and the deflecting currents $I_{L3}$ and $I_{L4}$ in forward path and backward path are supplied to the horizontal deflecting coil L and timings of deflection of forward path and backward path are controlled by switching timing of this change over, so that the deviation of the display image in forward path and backward path can be prevent easily and reliably.

At this time, timings of deflection in respectively forward path and backward path are controlled on the basis of the phase comparison results S4 between the terminal voltage $V_L$ of the horizontal deflecting coil L and the horizontal synchronizing signal HD, so that the display image synchronizing with the horizontal synchronizing signal HD can be formed easily.

Further, the deflecting coil L is driven by the first and second resonance circuit, while the first and second switching circuits 30 and 32 are complementarily changed over by the first and second timing control circuits 22 and 24 to control said switching timings and timings of deflection in forward path and backward path, so that the deviation of linearity can be prevent beforehand and the deflecting coil L can be driven efficiently.

Furthermore, in accordance with a fifth aspect of the invention, a bi-directional deflecting circuit 18 is provided for supplying deflecting currents $I_{L3}$ and $I_{L4}$ of forward path and backward path to a horizontal deflecting coil L so as to form display images respectively by deflections of the forward path and the backward path, comprising: a first timing control circuit 22 for controlling timing of start of deflection of forward path or backward path so as to be synchronized with a horizontal synchronizing signal HD; and a second timing control circuit 24 for obtaining a comparison result S3 between the cycle of deflection of forward path and the cycle of deflection of backward path and for controlling timing of forward path or backward path on the basis of the comparison result S3.

Further, in accordance with a sixth aspect of the invention, a first resonance circuit for supplying deflecting current $I_{L3}$ of forward path and a second resonance circuit or supplying deflecting current $I_{L4}$ of backward path are included, and the first and second timing control circuits 22 and 24 supply deflecting currents $I_{L3}$ and $I_{L4}$ of the forward path and the backward path to the horizontal deflecting coil L by changing over the first and second resonance circuits to connect them to the horizontal deflecting coil L and changes timing for changing over of the first and second resonance circuits to control timings of start of deflection of forward path and backward path.

Furthermore, in accordance with a seventh aspect of the invention, the second timing control circuit 24 integrates a terminal voltage $V_L$ of the horizontal deflecting coil L and then obtains a comparison result S3 thereof with a sawtooth signal S1 synchronized with the horizontal synchronizing signal HD to thereby obtain the comparison result S3 between the cycle of deflection of forward path and the cycle of deflection of backward path and controls timing of start of deflection of backward path or forward path so as to bring the comparison result S3 to a predetermined level.

Moreover, in accordance with a eighth aspect of the invention, the second timing control circuit 100 logs the terminal voltage $V_L$ of the horizontal deflecting coil L to integrate it on the basis of the horizontal synchronizing signal HD.

In the above constitution, in the bi-directional deflecting circuit 18 for supplying deflecting currents $I_{L3}$ and $I_{L4}$ of forward path and backward path to the horizontal deflecting coil L: timing of start of deflection of forward path or backward path is controlled at the first timing control circuit 22 so as to be synchronized with the horizontal synchronizing signal HD; and the comparison result S3 between the cycle of deflection of forward path and the cycle of deflection of backward path is obtained at the second timing control circuit 24 and timing of start of deflection of backward path or forward path is controlled in the basis of the comparison result S3. Thus, deflection of forward path and backward path can be controlled such that it is synchronized with the horizontal synchronizing signal and the duty ratio thereof becomes 50 [%].

At this time, the first and second resonance circuits are changed over at the first and second timing control circuits 22 and 24 to supply deflecting currents $I_{L3}$ and $I_{L4}$ of forward path and backward path to the horizontal deflecting coil L. Thereby, timing of start of deflection of forward path and backward path can be easily controlled by switching the timing for changing over the first and second resonance circuits.

Further, after integrating the terminal voltage $V_L$ of the horizontal deflecting coil L, the comparison result S3 thereof with the sawtooth signal S1 synchronized with the horizontal synchronizing signal is obtained and timing of start of deflection of backward path or forward path is controlled to bring the comparison result S3 to a predetermined level. Thereby, deflection of forward path and backward path can be readily controlled to bring the duty ratio thereof to 50 [%].

Furthermore, at this time, the terminal voltage $V_L$ of the horizontal deflecting coil L may be logged to be integrated on the basis of the horizontal synchronizing signal KD, to improve the detection sensitivity.

Furthermore, in accordance with a ninth aspect of the invention, a bi-directional deflecting circuit 18 is provided for supplying deflecting currents $I_{L3}$ and $I_{L4}$ of forward path and backward path to a horizontal deflecting coil L so as to form display images respectively by deflections of the forward path and the backward path, including: a first phase control circuit 22 for controlling timing of deflection of forward path on the basis of a horizontal synchronizing signal HD and for keeping a constant relation in phase between an image signal SV forming the display image of forward path and phase of deflection of forward path; and a second phase control circuit 24 for controlling timing of deflection of backward path on the basis of the horizontal synchronizing signal HD, for keeping a constant relation in phase between the image signal SV forming the display image of backward path and the phase of deflection of the backward path and for keeping the display image of the backward path in agreement with the display image of the forward path.

Further, in accordance with a tenth aspect of the invention, the first and second phase control circuits 22 and 24 take in for a predetermined time period TH a terminal voltage $V_L$ of the horizontal deflecting coil L on the basis of the horizontal synchronizing signal HD to obtain an integral result V6 and control timings of start of deflection of the forward path and the backward path on the basis of the result of comparison between sawtooth signals S1 and S2 generated on the basis of the horizontal synchronizing signal HD and the integral result V6.

Furthermore, in accordance with an eleventh aspect of the invention, a first resonance circuit for supplying deflecting current $I_{L3}$ of forward path and a second resonance circuit for supplying deflecting current $I_{L4}$ of backward path are included, and the first and second phase control circuits 22 and 24 supply deflecting currents $I_{L3}$ and $I_{L4}$ of the forward path and the backward path to the horizontal deflecting coil L by changing over the first and second resonance circuits to connect them to the horizontal deflecting coil L and changes timing for changing over of the first and second resonance circuits to control timings of deflection of forward path and backward path.

Moreover, in accordance with a twelfth aspect of the invention, the first resonance circuit is composed of a serial resonance circuit consisting of a first switching circuit 30, a resonance capacitor C, a horizontal deflecting coil L and a first S-correction capacitor CS1, and the second resonance circuit is composed of a serial resonance circuit consisting of a second switch circuit 32, the resonance capacitor C, the horizontal deflecting coil L, and second S-correction capacitor CS2, the first and second phase control circuits 22 and 24 complementarily changing over the first and second switch circuits 30 and 32 so as to control the switching timing to control timings of deflection of forward path and backward path.

In the above constitution, timings of deflection of forward path and backward path are controlled respectively at the first and second phase control circuits 22 and 24 on the basis of the horizontal synchronizing signal HD to keep a constant relation in phase between the image signal SV and the phase of deflection. Thereby the display image can be maintained at a predetermined position even when the frequency of the horizontal synchronizing signal HD is changed.

Terminal voltage $V_L$ of the horizontal deflecting coil L is taken in for a predetermined time period TH at the first and second phase control circuits 22 and 24 on the basis of the horizontal synchronizing signal HD to obtain the integral result V6. Timings of start of deflection of forward path and backward path are controlled on the basis of the result of comparison between the sawtooth signals S1 and S2 and the integral result V6. By selecting the time period TH, an occurrence of steady phase error may be effectively avoided.

At this time, timing for changing over the first and second resonance circuits can be changed at the first and second phase control circuits 22 and 24 to control timings of deflection of forward path and backward path. Thereby, the present invention can be readily applied to a bi-directional deflecting circuit.

The resonance circuits are respectively composed of a serial resonance circuit consisting of the first switch circuit 30, the resonance capacitor C, the horizontal deflecting coil L and the first S-correction capacitor CS1, and a serial resonance circuit consisting of the second switch circuit 32, the resonance capacitor C, the horizontal deflecting coil L, and the second S-correction capacitor CS2. By complementarily changing over the first and second switch circuits 30 and 32 at the first and the second phase control circuits 22 and 24, degradation of linearity can be previously prevented to efficiently supply a deflecting current.

The nature, principle and utility of the invention will become more apparent from the following detailed description when read in conjunction with the accompanying drawings in which like parts are designated by like reference numerals or characters.

BRIEF DESCRIPTION OF THE DRAWINGS

In the accompanying drawings:

FIGS. 1A and 1B are signal waveform charts for explanation of a bi-directional deflection;

FIG. 4 is a block diagram for explanation of the operation of the same;

FIGS. 5A to 5G are signal waveform charts for explanation of the operation;

DESCRIPTION OF THE PREFERRED EMBODIMENTS

Preferred embodiments of this invention will be described with reference to the accompanying drawings:

(1) FIRST EMBODIMENT

(1-1) Overall Construction

Figure 2:
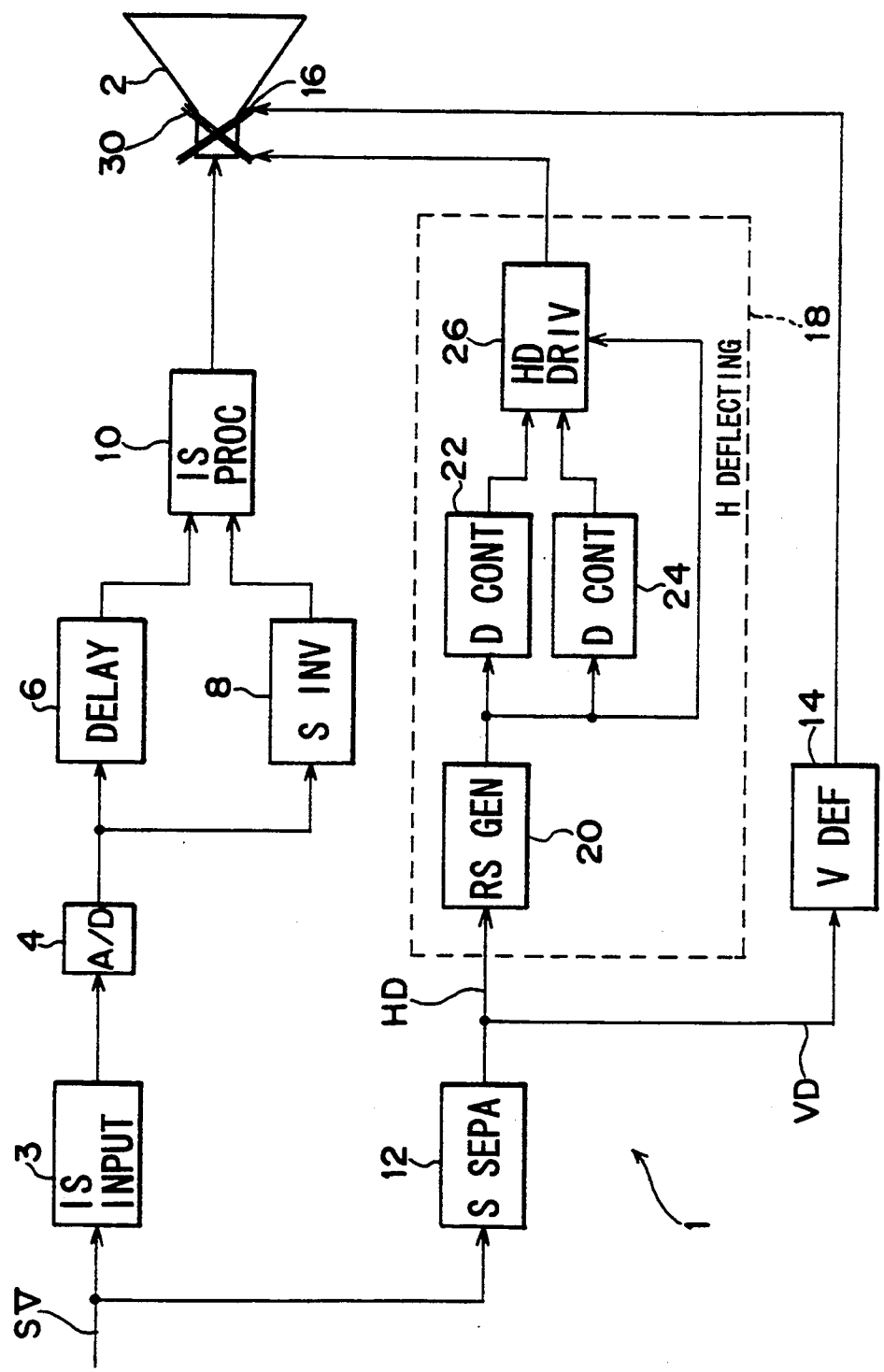
FIG. 2 is a block diagram showing a display apparatus according to the first embodiment of the present invention.

Referring to FIG. 2, numeral 1 generally denotes a display apparatus in which a cathode-ray tube 2 is driven using the technique of bi-directional deflection to display a video signal SV.

Specifically, in the display apparatus 1, the video signal SV is delivered to an image signal input circuit 3 where, after executing a predetermined signal processing, it is converted into luminance signal and color difference signal.

An analog-to-digital converter circuit (A/D) 4 takes in the luminance signal and the color difference signal through a predetermined filter circuit or the like (not shown) to provide output signal by converting them into digital signals.

A delay circuit 6 selectively takes in output signal for odd number lines with respect to the output signals of the analog-to-digital converter 4 and delivers it with a delay corresponding to one horizontal scanning period.

On the other hand, a sequence inverting circuit 8 is composed of a memory circuit, where write/read address is controlled to selectively take in output signal for even number lines with respect to the output signals of the analog-to-digital conversion circuit 4, which is then delivered as the inversion of the input sequence.

The display apparatus 1 is thereby adapted to generate image signals necessary in forward path and backward path at the delay circuit 6 and the sequence inverting circuit 8, respectively.

An image signal processing circuit 10 sequentially takes in the respective output signals of the delay circuit 6 and the sequence inverting circuit 8 to convert them into analog signals and then outputs them to the cathode-ray tube 2.

The image display apparatus 1 is thereby adapted to convert the video signal SV into the image signals which are necessary in bi-directional deflection and then to drive the cathode-ray tube on the basis of the image signals.

A synchronous separation circuit 12 outputs the horizontal synchronizing signal HD and the vertical synchronizing signal VD by separating them from the video signal SV.

A vertical deflecting circuit 14 generates a drive signal the signal level of which changes in a manner of steps on the basis of the vertical synchronizing signal VD, a vertical deflecting coil 16 being driven on the basis of this drive signal.

The display apparatus 1 is thereby adapted to form a vertical deflection magnetic field corresponding to the bi-directional deflection to drive the cathode-ray tube 2.

A horizontal deflecting circuit 18 provides the horizontal synchronizing signal HD to a reference signal generation circuit 20 having a PLL circuit structure, where a predetermined reference signal is generated.

Further, the horizontal deflecting circuit 18 provides the reference signal to deflection control circuits 22 and 24, whereby generating timings of starting of deflection respectively thus obtained timing signal to a horizontal deflection drive circuit 26.

By using the horizontal deflection drive circuit 26, a horizontal deflecting coil 30 is driven on the basis of this timing signal and the reference signal generated at the reference signal generation circuit 20, thereby driving the horizontal deflecting coil 30 using the technique of bi-directional deflection.

At this time, at the horizontal deflecting circuit 18, the deflection control circuits 22 and 24 are assigned to forward path and backward path, respectively. By thus controlling timings of starting of deflection of forward path and backward path, respectively, the display image is formed in synchronization with the horizontal synchronizing signal HD and degradation of picture quality in the display image can be previously prevented.

(1-2) Horizontal Deflection Drive Circuit

Figure 3:
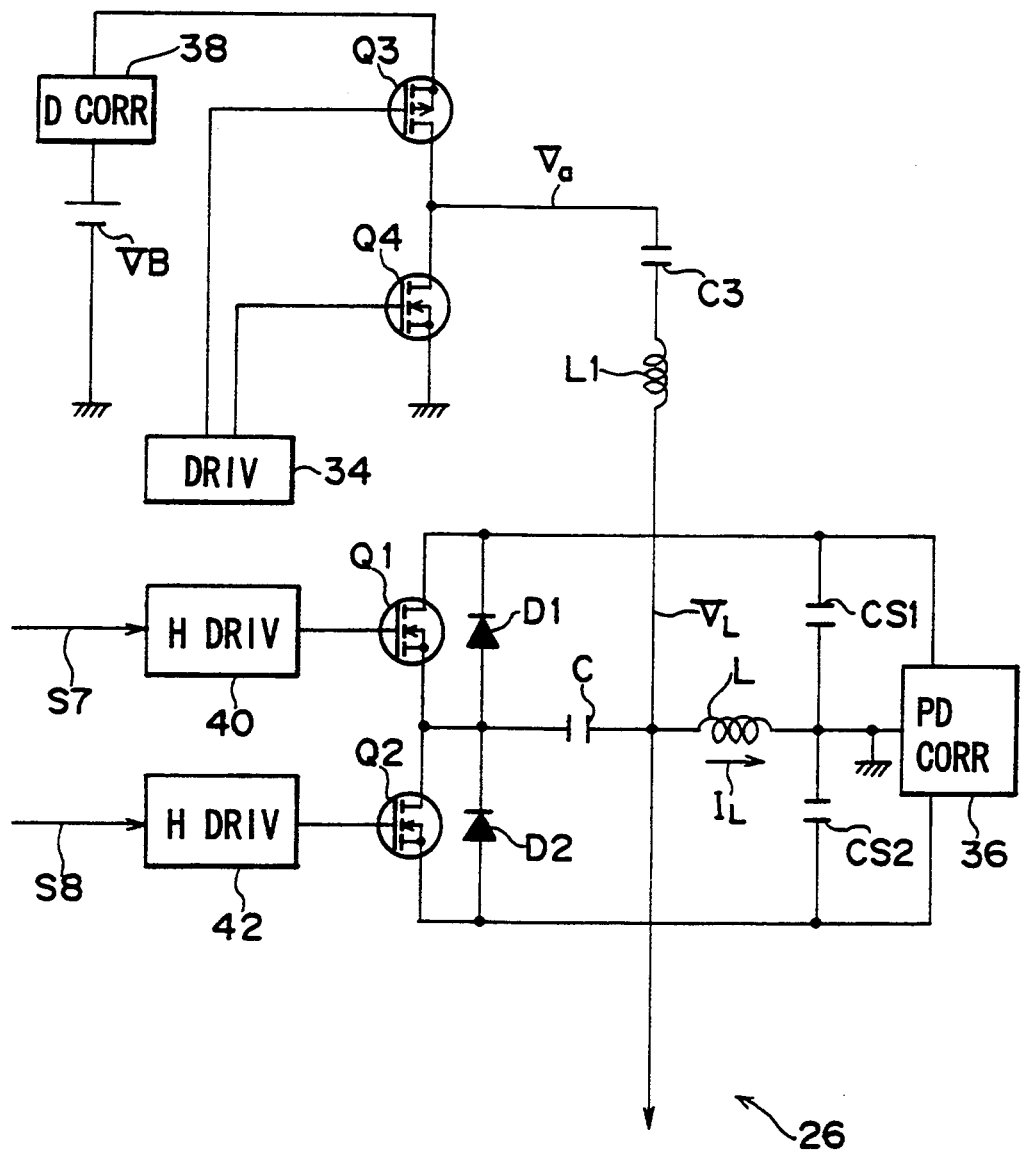
FIG. 3 is a block diagram showing a horizontal deflection drive circuit of FIG. 2.

As shown in FIG. 3, at the horizontal deflection drive circuit 26, field-effect transistors Q1 and Q2 are switched at predetermined timings to their off state, thereby controlling timings of starting of deflection of forward path and backward path. Thereby, deflecting current $I_L$ is supplied to the horizontal deflecting coil L.

That is, as shown in FIG. 4, at the horizontal deflection drive circuit 26, while a first switch circuit 30 is composed of the field-effect transistor Q1 and a diode D1, a second switch circuit 32 is composed of the field-effect transistor Q2 and a diode D2.

Thereby, the horizontal deflection drive circuit 26 switches the first switch circuit 30 to its on state to form a first resonance circuit by a resonance capacitor C, a deflecting coil L and a first S-correction capacitor CS1. On the other hand, it switches the second switch circuit 32 to its on state to form a second resonance circuit by the resonance capacitor C, the deflecting coil L and a second S-correction capacitor CS2.

Thereby, at each resonance circuit, a sine-wave current is caused to flow continually, if no loss occurs in the circuit, by switching the switch circuits 30 and 32 to its on state.

As shown in FIG. 4, on the basis of a terminal voltage $V_L$ across the deflecting coil (hereinafter referred to as deflection voltage) which varies in the manner of a sine wave as described and the horizontal synchronizing signal HD, the horizontal deflection drive circuit 26 switches the field-effect transistors Q1 and Q2 to their off state when the deflection voltage $V_L$ is lowered or raised to a predetermined voltage.

Thereby, the horizontal deflection drive circuit 26 switches the switch circuits 30 and 32 alternately to their on state at predetermined timings to supply deflecting currents $I_{L3}$ and $I_{L4}$ of forward path and backward path to the deflecting coil L.

Further, the horizontal deflection drive circuit 26 sets the resonance frequency of each resonance circuit to a frequency lower than the horizontal scanning frequency and changes over the switch circuits 30 and 32 at a cycle shorter than the half-cycle of the resonance frequency. It is thereby adapted to be capable of efficiently causing a deflection while previously preventing a degradation in linearity.

In other words, when the deflecting coil L is driven using a sine-wave current, linearity is degraded during the time period in the vicinity of the peak of the deflecting current $I_L$, which is indicated by slanting lines in FIGS. 1A and 1B. Consequently, the deflection coil in this type of deflecting circuit must be driven so as to cause an overscan, thus wastefully supplying the deflecting current $I_L$ for the time periods indicated by the slanting lines.

For this reason, in this embodiment, when the deflecting voltage $V_L$ after passing a peak is lowered to a predetermined voltage at a point in time t1 (FIGS. 5A and 5B), the field-effect transistor Q1 is switched to its off state (FIG. 5E).

At this time, in the horizontal deflection drive circuit 26, the S-correction capacitor CS2 is charged with the deflecting current $I_{L3}$ of forward path. Thus, when the field-effect transistor Q1 is switched to its off state, the deflecting voltage $V_L$ is sharply lowered and the diode D2 is instantaneously switched to its on state (FIG. 5F).

Thereby, at the horizontal deflection drive circuit 26, the deflecting voltage $V_L$ is sharply lowered by the amount corresponding to what is indicated by the slanting lines in FIGS. 1A and 1B, to change over the connection of the deflecting coil L1 from the first resonance circuit to the second resonance circuit.

The field-effect transistor Q2 is switched to its on state during the period until the deflecting voltage $V_L$ in this state passes its peak. Then, when the deflecting voltage $V_L$ is raised to a predetermined voltage at a point in time t2 after its peak, the horizontal deflection drive circuit 26 switches the field-effect transistor Q2 to its off state (FIG. 5G).

At this time, in the horizontal deflection drive circuit 26, the S-correction capacitor CS1 is charged with the deflecting current $I_{L4}$ of backward path. Thus, when the field-effect transistor Q2 is switched to its off state, the deflecting voltage $V_L$ is sharply raised and the diode D1 is instantaneously switched to its on state (FIG. 5D).

Thereby, at the horizontal deflection drive circuit 26, the deflecting voltage $V_L$ is sharply raised correspondingly to what is indicated by the slanting lines in FIGS. 1A and 1B, to change over the connection of the deflecting coil L1 from the second resonance circuit to the first resonance circuit. Then the field-effect transistor Q1 is switched to its on state in the time period until the deflecting voltage $V_L$ passes its peak.

Of the deflecting current $I_L$, the portion at which linearity is inferior in the same manner as the deflecting voltage $V_L$ may thus be removed, whereby the horizontal deflection drive circuit 26 is able to previously prevent degradation in linearity to efficiently drive the deflecting coil L.

Further, in the horizontal deflection drive circuit 26, field-effect transistors Q3 and Q4 are alternately switched to their on states at a drive circuit 34 on the basis of the deflecting voltage $V_L$, thereby forming a predetermined drive power source Va (FIG. 5C).

Furthermore, the horizontal deflection drive circuit 26 supplies the drive power Va to a connection node of the resonance capacitor C and the deflecting coil L through a series circuit consisted of capacitor C3 and coil L1, thereby supplying the power that is necessary for driving of the deflecting coil L1.

A pin distortion correction circuit 36 generates a parabolic signal the signal level of which is changed in the manner of a parabola in the positive and negative directions in synchronization with the vertical synchronizing signal. The terminal voltage of S-correction capacitors CS1 and CS2 is modulated by the parabolic signal.

Thereby, the horizontal deflection drive circuit 26 performs S correction on the display image and corrects pin distortion of the display image.

Upon such correction of pin distortion, a distortion correction circuit 38 modulates the source voltage of the power VB so that the voltage is varied following the parabolic signal and provides the output thereof to the field-effect transistor Q3. Thereby the horizontal deflection drive circuit 26 is adapted to previously prevent shift in the display images of forward path and backward path, which occurs in this type of horizontal deflecting circuit when pin distortion is to be corrected.

Here, the horizontal deflection drive circuit 26 performs on/off control with respect to the field-effect transistors Q1 and Q2, by inputting output signals S7 and S8 of the deflection control circuits 22 and 24 to the field-effect transistors Q1 and Q2, respectively, through horizontal drive circuits 40 and 42.

Thereby, the horizontal deflection drive circuit 26 controls the timing of starting of deflection of forward path and backward path on the basis of the deflecting voltage $V_L$ and the horizontal synchronizing signal, so as to form a display image synchronized with the horizontal synchronizing signal and at the same time to previously prevent degradation in picture quality of the display image.

(1-3) Deflection Control Circuit

Figure 6:
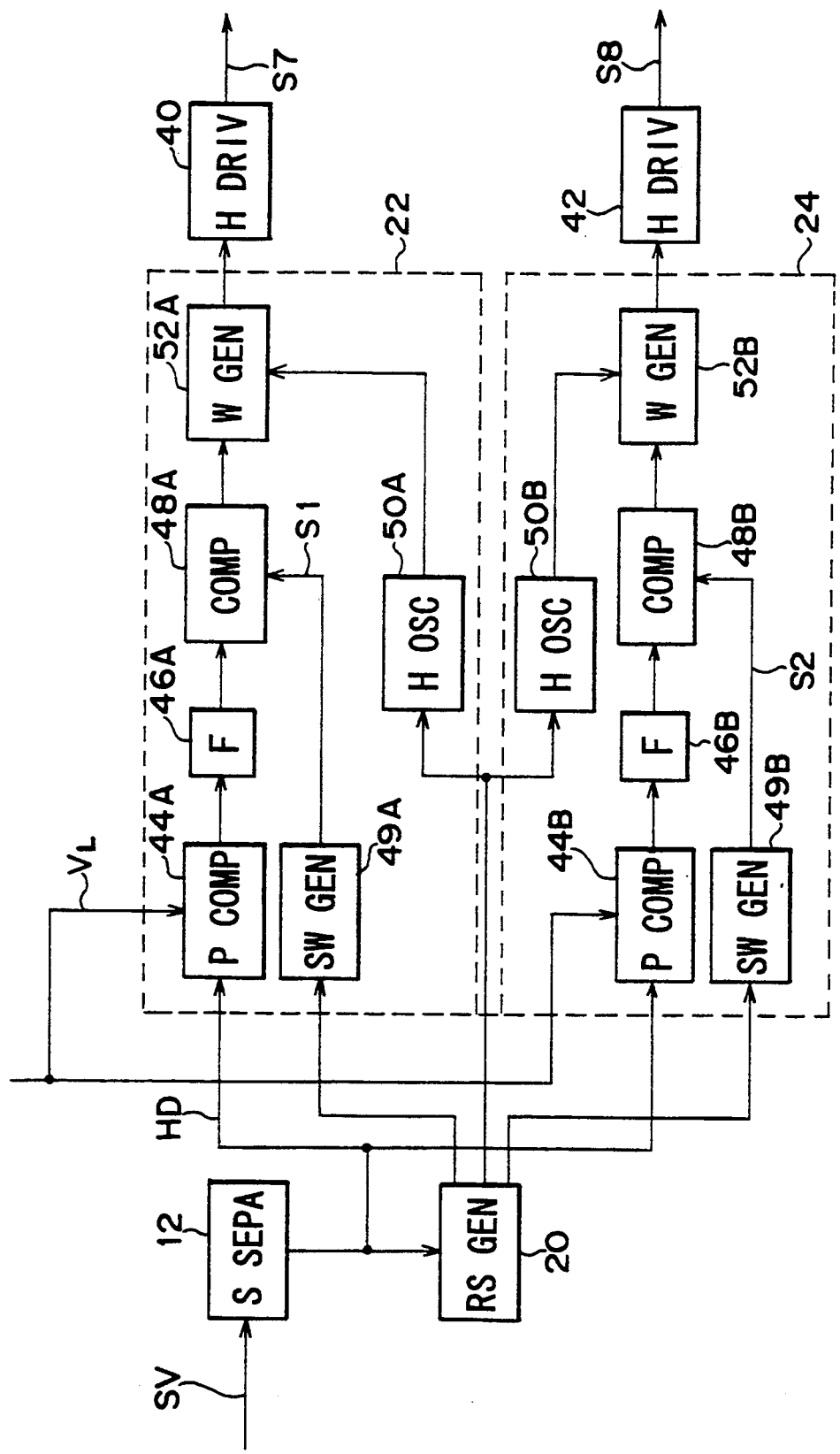
FIG. 6 is a block diagram showing a deflecting control circuit.

As shown in FIG. 6, the deflection control circuit 22 inputs the deflecting voltage $V_L$ and the horizontal synchronizing signal HD to a phase comparison circuit 44A, where timing for starting of deflection of backward path is detected on the basis of the horizontal synchronizing signal HD.

Further, after converting the result of phase comparison into a DC voltage at a subsequent filter circuit 46A, the deflection control circuit 22 obtains a comparison result thereof with a predetermined sawtooth signal S1 at a comparator circuit 48A, thereby setting the timing of starting of deflection of backward path on the basis of the horizontal synchronizing signal HD.

Here, the sawtooth signal S1 is generated at a sawtooth waveform generation circuit 49A on the basis of the output signal of the reference signal generation circuit 20.

A horizontal oscillation circuit 50A generates timing for switching the field-effect transistor Q1 to its on state on the basis of the output signal of the reference signal generation circuit 20.

A waveform generation circuit 52A generates a drive signal S7 of the field-effect transistor Q1 on the basis of timing starting of deflection of backward path set at the comparator circuit 48A and of timing for switching the field-effect transistor Q1 to its on state generated at the horizontal oscillation circuit 50A. It outputs the drive signal S7 through the horizontal drive circuit 40.

On the other hand, in the deflection control circuit 24, the deflecting voltage $V_L$ and the horizontal synchronizing signal HD are input to a phase comparison circuit 44B. At this time, by inputting the deflecting voltage $V_L$ and the horizontal synchronizing signal HD as having the opposite polarity from the case of the phase comparison circuit 44A, timing for starting of deflection of forward path is detected on the basis of the horizontal synchronizing signal HD.

Further, the deflection control circuit 22 converts the result of phase comparison into a DC voltage at a subsequent filter circuit 46B and then provides it to a comparator circuit 48B.

At this time, at the comparator circuit 48B, a comparison result is obtained on the basis of a sawtooth signal S2 having its phase different by 180[°] from the sawtooth signal S1. Thereby, timing for starting of deflection of forward path is set on the basis of the horizontal synchronizing signal HD.

Here, the sawtooth signal S2 is generated at a sawtooth waveform generation circuit 49B on the basis of the output signal of the reference signal generation circuit 20.

The waveform generation circuit 52B generates a drive signal S8 of the field-effect transistor Q2, on the basis of deflection starting timing of forward path set at the comparator circuit 48B and of timing for turning on the field-effect transistor Q2 generated at the horizontal oscillation circuit 50B. It outputs the drive signal S8 through the horizontal drive circuit 42.

Thereby, the horizontal deflection circuit 18 is adapted to control timings of starting of deflection of forward path and backward path respectively at the deflection control circuits 22 and 24 each having a separate identity, thereby forming a display image in synchronization with the horizontal synchronizing signal and displaying the display images of forward path and backward path at an identical position so as to previously prevent degradation in picture quality of the display image.

Figure 7:
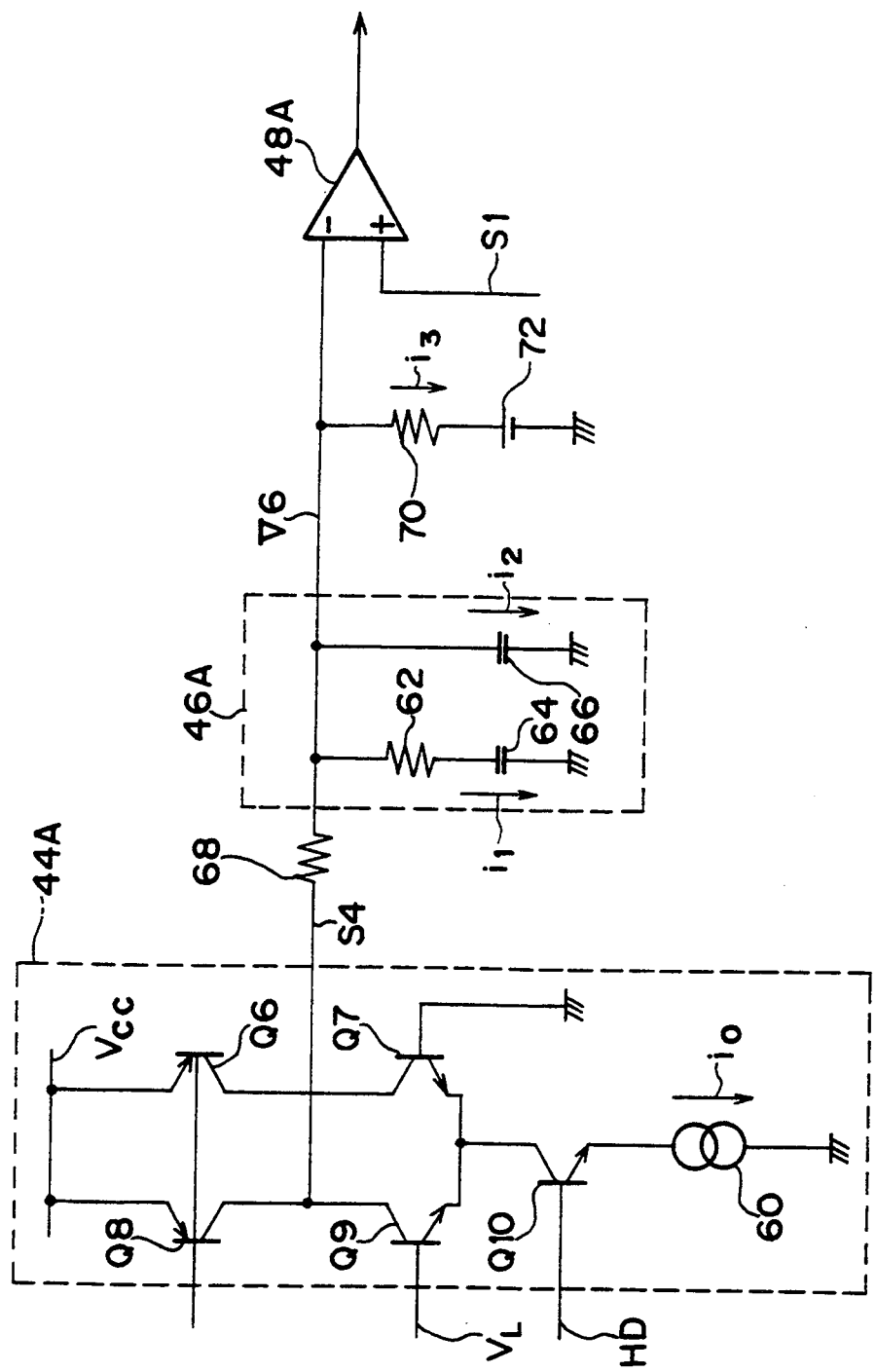
FIG. 7 is a connection diagram for showing the specific construction.

In particular, as shown in FIG. 7, at the phase comparison circuit 44A, series connected transistors Q6 and Q7 and transistors Q8 and Q9 are connected through a transistor Q10 to a constant current source 60 of electric current $i_0$, the horizontal synchronizing signal HD being input to the transistor Q10.

Further, as shown in FIGS. 8A to 8E, the phase comparison circuit 44A inputs the deflection voltage $V_L$ (FIG. 8A) to the transistor Q9 through a voltage divider circuit and an integrating circuit (not shown), providing the result of phase comparison from the collector side of the transistor Q9.

Figure 8A:
FIGS. 8A to 8E are signal waveform charts for explanation of the operation.
Figure 8B:
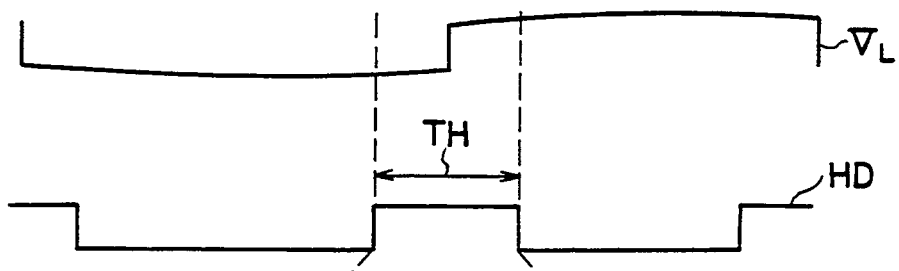

At this time, the phase comparison circuit 44A is adapted to input the horizontal synchronizing signal HD in an inverted manner (FIG. 8B). On the basis of points in time of starting of deflection of forward path and backward path which are determined by the horizontal synchronizing signal HD, it is thereby raised to its state of operation for a predetermined time period TH before and after such points in time.

Figure 8C:
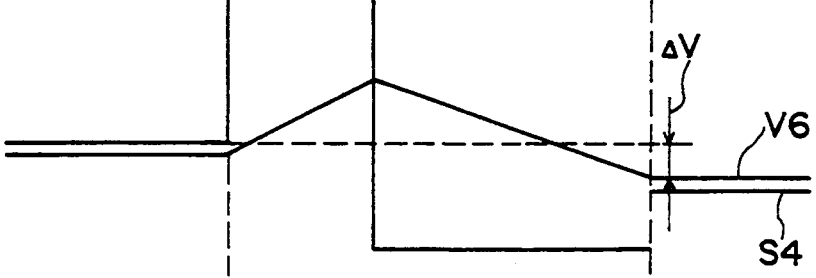
Figure 8D:
Figure 8E:
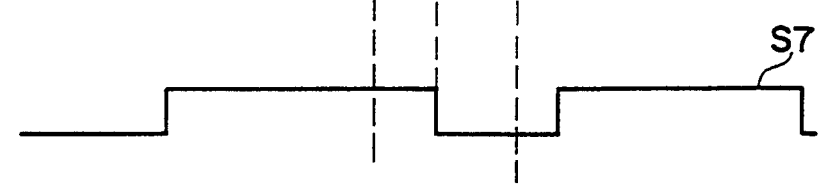

Thereby, at the phase comparison circuit 44A, in the time period TH, a phase comparison result S4 may be obtained, in which the signal level rises in synchronization with the horizontal synchronizing signal HD and then is inverted in polarity due to lowering of the deflection voltage $V_L$ and subsequently the signal level is raised in synchronization with the horizontal synchronizing signal HD (FIG. 8C).

On the other hand, the filter circuit 46A is composed of a lag lead filter circuit having a series-connected circuit consisting of a resistance 62 and a capacitor 64, and a capacitor 66 which are grounded in parallel, the phase comparison result S4 being input thereto through a resistance 68.

Thereby, the filter circuit 46A integrates the phase comparison result S4 and outputs the result thereof. When timing of ascending of the deflection voltage $V_L$ is changed with respect to the mid-point in time of the period TH during which the signal level of the horizontal synchronizing signal HD is raised, a detection voltage V6 the overall DC level of which varies correspondingly to the amount of such change is obtained (FIG. 8C).

Specifically, in this case, due to the fact that the deflection voltage $V_L$ is raised at a point in time earlier than the mid-point in time of the period TH, the time period during which the signal level rises becomes shorter in the phase comparison result S4. Thereby, the DC level in the result of the integration is reduced by a value $\Delta V$.

Thereby, the deflection control circuit 22 drives the horizontal deflection drive circuit 26 on the basis of such detection result to form a feedback loop as a whole. The field-effect transistor Q1 is driven so as to bring the value $\Delta V$ to 0 [V].

Specifically, at the filter circuit 46A, the detection voltage V6 is supplied to the comparator circuit 48A, where a comparison result thereof with the sawtooth signal S1 is obtained (FIGS. 8D and 8E), thereby setting timing for switching the field-effect transistor Q1 to its off state.

At this time, in the deflection control circuit 22, the voltage of the deflection voltage V6 is corrected by the resistance 70 and a reference power supply 72, thereby keeping the display position of the display image formed by forward path to a predetermined position.

Assuming that: the current value of the constant current source 60 is $i_0$; the currents of the capacitors 64 and 66 are $i_1$ and $i_2$, respectively; and the current of the resistance 70 is $i_3$, the following formula can be obtained:

$$i0 = i1 + i2 + i3 \quad (1)$$

if the phase comparison circuit 44A is operated in the saturation region, and the change amount $\Delta V$ of the detection voltage V6 can be expressed by the following formula:

$$\begin{aligned} \Delta V \quad &(1/C_{64}) \cdot \int i_1 dt \\ &= (1/C_{66}) \cdot \int i_2 dt + i_2 R_{62} \\ &= i_3 \times R_{70} \end{aligned} \quad (2)$$

where $C_{64}$ and $C_{66}$, $R_{62}$ and $R_{70}$ represent the values of capacitors 64 and 66, resistances 62 and 70, respectively.

Thus, by selecting operation period TH of the phase comparison circuit 44A and the values of capacitors 64 and 66, resistances 62 and 70, the change amount $\Delta V$ can be detected at a predetermined detection sensitivity.

On the other hand, at the deflection control circuit 24 for controlling timing of forward path, the deflecting voltage $V_L$ is processed in a similar manner on the basis of the horizontal synchronizing signal HD, thereby setting the timing for switching the field-effect transistor Q2 to its off state.

(1-4) Operation

Here, control in which the deflection control circuits 22 and 24 are provided as described exclusively for forward path and backward path, respectively, to synchronize them with the horizontal synchronizing signal HD and to prevent an overlapped image on the display image is nothing but the control in which the duty ratio of a periodic function synchronized with the horizontal synchronizing signal HD is caused to vary.

Here, a periodic function f(t) of an ordinary rectangular waveform can be represented by a Fourier series as in the following formulas.

$$f(t) = 0.5 \cdot a0 + \Sigma[a_n \cdot \cos(n\omega t) + b_n \cdot \sin(n\omega t)] \quad (3)$$

$$a_n = (2/T) \cdot \int_{-t/2}^{t/2} f(t) \cdot \cos(n\omega t) dt \quad (4)$$

$$= (2/T) \cdot \int_0^\tau A \cdot \cos(n\omega t) dt$$

$$= (2/n\omega T) \cdot [A \cdot \sin(n\omega t)]_0^\tau$$

$$= (1/n\omega T) \cdot [A \cdot \sin(n\omega \tau)]$$

$$a_n = (2/T) \cdot \int_{-t/2}^{t/2} f(t) \cdot \cos(n\omega t) dt \quad (5)$$

$$= (2/T) \cdot \int_0^\tau A \cdot \sin(n\omega t) dt$$

$$= (-2/n\omega T) \cdot [A \cdot \cos(n\omega t)]_0^\tau$$

$$= (-A/n\omega T) \cdot [A \cdot \cos(n\omega \tau) - 1]$$

$$0.5 a_0 = (1/T) \cdot \int_{-t/2}^{t/2} f(t) dt \quad (6)$$

$$= (1/T) \cdot (A\tau)$$

Here, when $\tau/T$ represents the duty ratio, A represents the amplitude and the duty ratio is 50 [%], since it can be represented by the following formula:

$$\tau = (T/2) \quad (7)$$

the relation of the following formula holds:

$$\omega t = (2\pi/T) \cdot (T/2) = \pi \quad (8)$$

Here, when "n" is noticed of the formulas (4) to (6), the value of "n" in bi-directional deflection varies in accordance with the drive waveform of the deflecting circuit.

Specifically, n=1 may be set in the case of driving by a sine wave and n=1, 3, 5, ... (odd number) can be set in the case of driving by a rectangular waveform, and, after all, representation by the following formula is possible.

$$a_n = 0 \quad (9)$$

$$b_n = (2A/n\pi)$$

On the other hand, with respect to the deflecting current $I_L$ flowing through the horizontal deflection coil L, since a representation by the following formula:

$$V_L = L \cdot (dI_L/dt) \quad (10)$$

is possible, formulas (3), (8), (9) and (10) are substituted and $\tau = \pi$ can be set to obtain the relation of the following formula.

$$i = (1/L) \cdot \int f(t) dt \quad (11)$$

$$= (1/L) \cdot \int [0.5 \cdot a_0 + \Sigma b_n \cdot \sin(n\omega t)] dt$$

$$= (1/L) \cdot [0.5 \cdot a_0 t - (1/n\omega) \cdot \Sigma b_n \cdot \cos(n\omega t)]$$

Here, the first term on the right side of the equation represented by $0.5\, a_0 t$ represents DC component flowing through the deflection coil L, which can be easily removed by a coupling capacitor.

On the other hand, the second term on the right side is constituted by an even function, showing an excellent symmetry of forward path and backward path. It is seen that disagreement in display image between forward path and backward path can be prevented.

On the other hand, the second term on the right side is constituted by an even function, showing an excellent symmetry of forward path and backward path. It is seen that disagreement in display image between forward path and backward path can be prevented.

In other words, if the horizontal deflection coil L is driven under the condition of a duty ratio of 50 [%], the display image may be formed in synchronization with the horizontal synchronizing signal and disagreement in display image between forward path and backward path can be prevented.

In actual bi-directional deflection, however, deflection current is delicately changed between forward path and backward path, for example, due to variance in electronic component parts for deflection of forward path and backward path or non-linear operation of circuit component parts.

This also causes a change in display position or the like between forward path and backward path in the display image.

For this reason, a consideration is given to a case where the phase of the above described periodic function f(t) is changed from the duty ratio of 50 [%].

In this case, since the term of "$a_n$" in formula (3) is added to formula (11), the matter is how the term of "$a_n$" varies with respect to a change in the duty ratio.

Specifically, $\omega\tau$ can be put as follows:

$$\omega\tau = (2\pi/T) \cdot (T\kappa) = 2\pi\kappa \quad (12)$$

$$0 < \kappa < 1$$

thereby "$a_n$" in formula (3) can be represented based on formula (5) as:

$$a_n = 1/(n\pi)[A \cdot \sin(2\pi\kappa n)] \quad (13)$$

Here, in formula (13), it can take positive and negative values from the value of "0" at the center where $\kappa = 0.5$. Thus, by variably controlling the duty ratio by providing the independent deflection control circuits respectively for forward path and backward path as in this embodiment, even a disorder in symmetrical control or deflecting current due to variance in circuit component parts or the like can be prevented.

On the other hand, in the case where the horizontal synchronizing signal or the like is changed, the horizontal deflection control circuit 18 as a whole is to be operated in synchronization with the video signal within the lock range of the reference signal generation circuit 20.

Accordingly, if the cycle T of the horizontal synchronizing signal HD is changed to cycle KT (for example K being 0.9 to 1.1), the feedback loop is formed as a whole as that deflection of forward path and backward path is started at the mid-point in time of a time period TH during which such horizontal synchronizing signal HD rises.

Thereby, even when the horizontal synchronizing frequency is changed, steady phase error with respect to the change in the horizontal synchronizing frequency may be canceled. Thereby, the display images of the forward path and backward path may be displayed at correct display positions.

Further, the display images of forward path and backward path can be displayed at correct display positions not only in the case where the horizontal synchronizing frequency is changed but also in the case where the temperature of the horizontal deflection circuit as a whole is changed.

(1-5) Advantage of the Embodiment

With the above construction, starting timings of deflection for forward path and backward path are controlled at the deflecting control circuit respectively, so that the distortion of the display images of forward path and backward path can be prevented previously. Thus, the display image is formed by synchronizing with the horizontal synchronization signal and the picture quality of the display image can be prevented from its deterioration previously.

(1-6) Other Embodiments (1-6-1) Note that the embodiments discussed above have dealt with the case where deflections of forward path and backward path are switched at a period shorter than ½ period of the resonance frequency. However, the present invention is not limited to this but, for example, it is also possible to provide a predetermined quiescent period to switch deflection of forward path and backward path and the length of such quiescent period at this time may be controlled to previously prevent a disagreement in display image.

(1-6-2) Further, note that the embodiments discussed above have dealt with the case where the field-effect transistors Q1 and Q2 are switched to their off state to alternately connect two resonance circuits so as to supply deflecting current of forward path and backward path to the horizontal deflecting coil L. However, the present invention is not limited to this but, for example, it may be widely applied to bi-directional circuits such as one disclosed in U.S. Pat. No. 5,051,668.

(1-7) As has been described, according to the present invention, timing of deflection of forward path and backward path is respectively corrected so that the relation in phase between the image signal and the deflection takes a constant value on the basis of the horizontal synchronizing signal. Thus, even when the frequency of the horizontal synchronizing signal has changed, occurrence of steady phase error may be previously prevented and thereby a horizontal shift in display image may be prevented.

(2) SECOND EMBODIMENT

(2-1) Deflection Control Circuit

Figure 9:
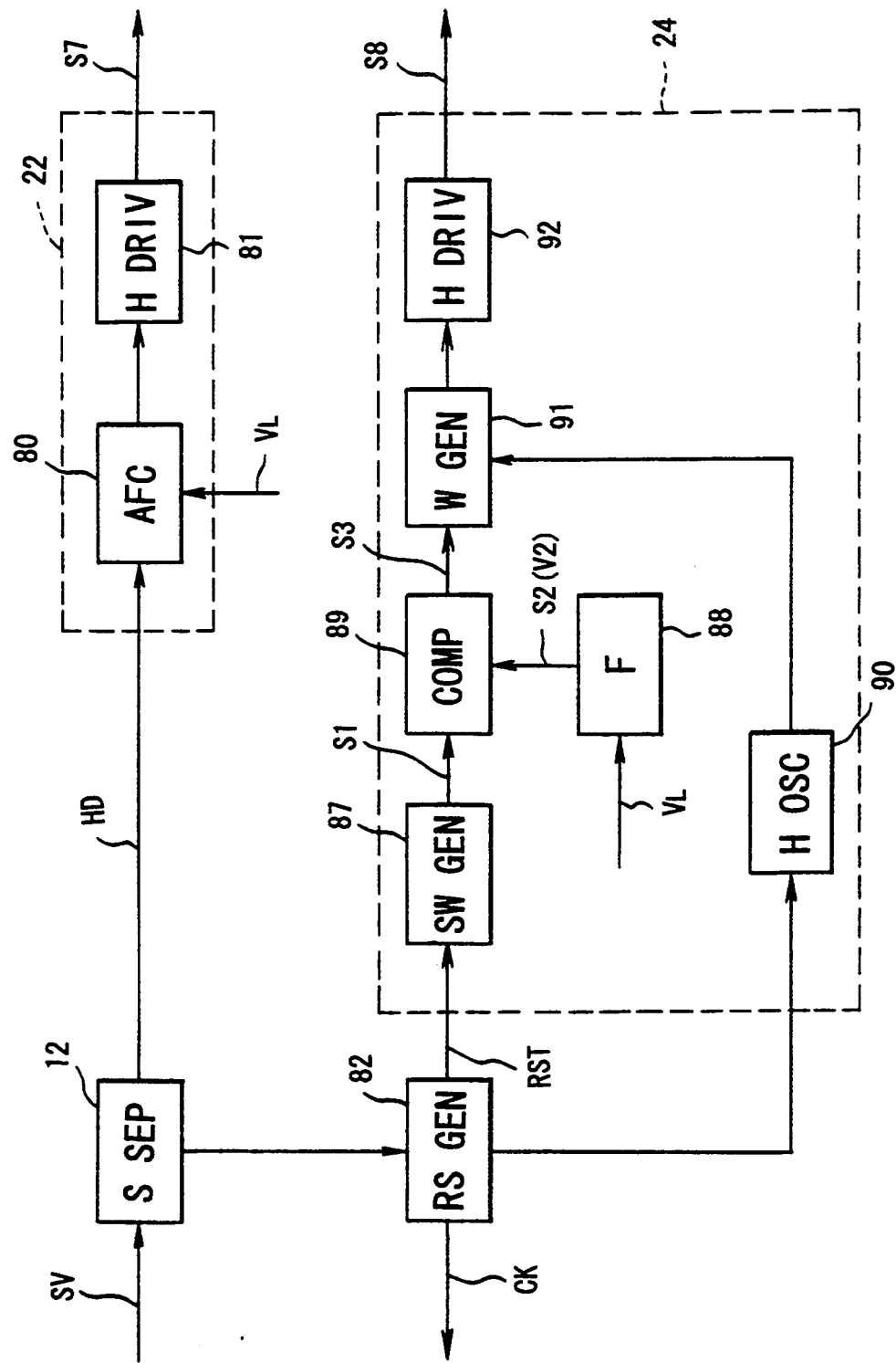
FIG. 9 is a block diagram showing a deflecting control circuit of the second embodiment of the invention.

In the case of second embodiment, the deflection control circuits 22 and 24 of FIG. 2 are constructed as shown in FIG. 9.

In FIG. 9, the deflection control circuit 22 supplies to an AFC circuit 80 the horizontal synchronizing signal HD which has been separated at the synchronous separation circuit 12, whereby drive signal S7 is generated to perform on/off control of the field-effect transistor Q1 (FIG. 3).

Specifically, the AFC circuit 80 has an identical construction as an AFC circuit to be used in raster scanning, which drives a built-in horizontal oscillation circuit on the basis of the horizontal synchronizing signal HD to thereby generate the drive signal S7.

Further, the deflection control circuit 22 outputs the drive signal S7 to the field-effect transistor Q1 through the horizontal drive circuit 81, thereby controlling timing of start of deflection of backward path so that it is synchronized with the horizontal synchronizing signal HD.

On the other hand, the deflection control circuit 24 controls timing of start of deflection of forward path so that the cycles of deflection of forward path and backward path are equalized.

Figure 10:
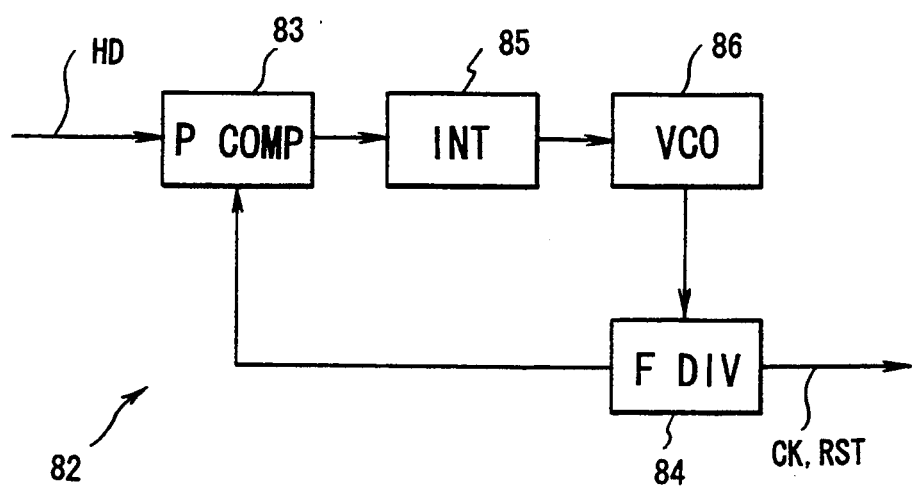
FIG. 10 is a block diagram showing a reference signal generation circuit of FIG. 9.
Figure 11:
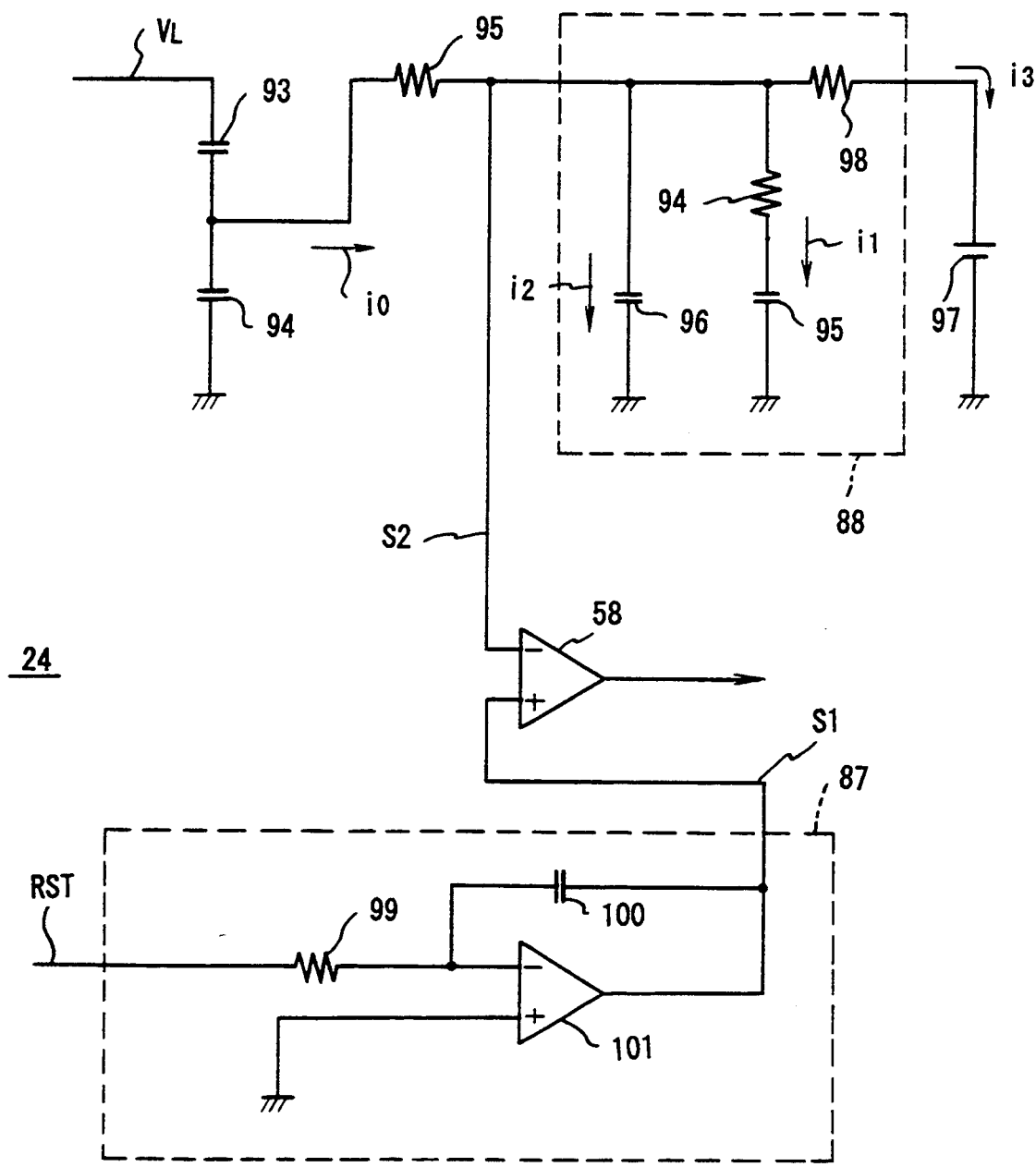
FIG. 11 is a connection diagram showing the specific construction of a deflection control circuit.

Here, as shown in FIG. 10, the reference signal generation circuit 82 inputs the horizontal synchronizing signal HD to a phase comparator 83 to detect a phase comparison result thereof with the output signal of a frequency divider circuit 84.

By integrating the output signal of the phase comparator 83, an integrating circuit 85 converts the phase comparison result to a DC voltage and then drives a voltage-controlled oscillator (VCO) 86 by means of this DC voltage.

By dividing the frequency of the output signal of the voltage-controlled oscillator 86, the frequency divider circuit 84 generates a clock signal CK for the analog-to-digital conversion circuit 4 and the sequence inversion circuit 8 and generates the reset signal RST for sawtooth waveform generation circuit 87.

Thereby, the reference signal generation circuit 82 is adapted to generate the various reference signals which are necessary in the display apparatus 2.

By integrating the deflection voltage $V_L$, a filter circuit 88 generates a phase comparison result S2 the DC level of which changes in accordance with the duty ratio of the deflection voltage $V_L$.

By detecting a comparison result S3 between the sawtooth signal S1 of the sawtooth waveform generation circuit 87 and the phase comparison result S2 of the filter 88, a comparator circuit 89 detects timing for switching the field-effect transistor Q2 (FIG. 3) to its off state.

In other words, timing of start of deflection of forward path is controlled at the deflection control circuit 22 so that it is synchronized with the horizontal synchronizing signal HD. Thereby, of the comparison result between the phase comparison result S2 DC level of which changes in accordance with the duty ratio of the deflection voltage $V_L$ and the sawtooth signal generated on the basis of the horizontal synchronizing signal HD, timing of switching of the signal level is changed when the duty ratio of the deflection voltage $V_L$ is changed.

Thereby, the deflection control circuit 24 forms a feedback loop of the horizontal deflecting circuit 18 as a whole so that the duty ratio is brought to 50 [%] with respect to the deflecting cycles of forward path and backward path.

A horizontal oscillation circuit 60 generates timing signal for switching the field-effect transistor Q2 to its on state on the basis of the output signal of the reference signal generation circuit 82. On the other hand, a waveform generation circuit 91 generates a drive signal S8 for driving the field-effect transistor Q2 on the basis of this timing signal and the output signal of the comparator circuit 89, outputting it through a horizontal drive circuit 92.

Thereby, the horizontal deflecting circuit 18 controls timing of start of deflection of backward path at the deflection control circuit 22 so that it is synchronized with the horizontal synchronizing signal HD and obtains a comparison result of deflection cycles of forward path and backward path at the deflection control circuit 24. Timing of start of deflection of forward path is controlled so that the duty ratio of the deflection cycle becomes 50 [%].

Specifically, as shown in FIGS. 11 and 12A to 12F, the deflection control circuit 24 divides the deflection voltage $V_L$ (FIG. 12A) to a predetermined level at a voltage divider circuit consisting of capacitors 93 and 94 and then input it to the filter circuit 88 through a resistance 70.

Figure 12A:
FIGS. 12A to 12F are signal waveform charts for explanation of the operation.
Figure 12B:
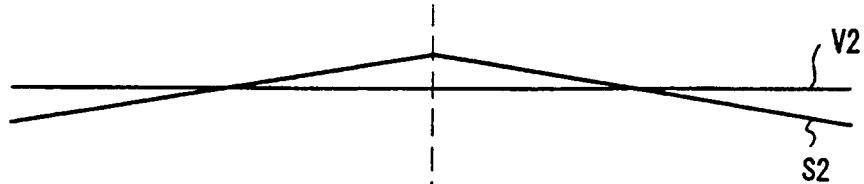
Figure 12C:
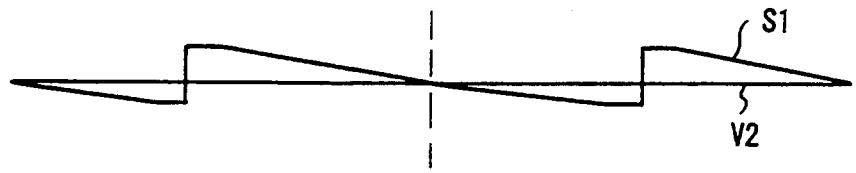

Here, the filter circuit 88 is constituted by a lag lead filter circuit in which a series circuit consisting of a resistance 94 and capacitor 95, and a capacitor 96 are grounded in parallel and which is connected to a bias power source 97 through a resistance 98, thereby smoothing the integrating result S2 of the deflection voltage $V_L$ to output the DC level V2 thereof (FIGS. 12B and 12C).

Figure 12D:
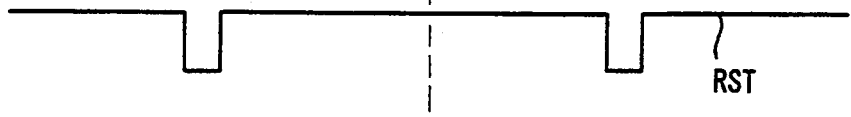

On the other hand, the sawtooth waveform generation circuit 87 is formed of a Miller integrator circuit which is constituted by an input resistance 99, an integrating capacitor 100 and an operational amplifier circuit 101, thereby generating the sawtooth signal S1 on the basis of the reset signal RST (FIG. 12D).

Figure 12E:
Figure 12F:

Therefore, the deflection control circuit 24 generates through the comparator circuit 58 timing for off-controlling the field-effect transistor Q2 and generates a drive signal S8 at the waveform generation circuit 91 (FIG. 12E).

In this manner, the field-effect transistor Q1 is driven by the drive signal S7 (FIG. 12F) output from the horizontal drive circuit 81 and the field-effect transistor Q2 is driven by the drive signal S8 output from the horizontal drive circuit 92. Thus, it is possible to synchronize the deflections of forward path and backward path with the horizontal synchronizing signal HD and to maintain the duty ratio thereof at 50 [%] and a overlapped image and degradation of resolution in the display image can be prevented, thereby previously preventing degradation in picture quality of the display image.

Further, even when the horizontal frequency has changed or when temperature of the horizontal deflecting circuit as a whole has changed, synchronization with the horizontal synchronizing signal HD is possible and the duty ratio thereof can be maintained at 50 [%], to previously prevent degradation in picture quality of the display image.

Furthermore, even when variance occurs in circuit component parts of the first and second resonance circuits, degradation in picture quality of display image may be previously prevented.

Moreover, in this embodiment, the reference power source 97 is formed by a latch circuit for latching control data output from the system control circuit and a digital-to-analog conversion circuit for converting the output data of the latch circuit to an analog signal. It is thereby adapted to be capable of adjusting the voltage of the reference power source 97 by switching control data of the system control circuit.

The deflection control circuit 22 is thereby adapted so that the position of the image center can be adjusted with respect to the display image.

(2-2) Operation

As is described above with respect to the formulas (1) to (13), even when the horizontal synchronizing frequency is changed, occurrence of steady phase error with respect to the change in the horizontal synchronizing frequency can be prevented. Thereby, the display images of the forward path and the backward path can be displayed at correct display positions.

Further, the display images of forward path and backward path can be displayed at correct display positions not only in the case when the horizontal synchronizing frequency is changed but also in the case where the temperature of the horizontal deflection circuit as a whole is changed.

By the way, the DC level $\Delta V$ of the output signal S2 can be expressed by the formulas (1) and (2).

Thereby, if the deflection voltages $V_L$ of forward path and backward path exhibit an identical change at the duty ratio of 50 [%], the DC level $\Delta V$ can be maintained at "0" level even when the frequency of the horizontal synchronizing signal HD has changed.

Accordingly, it is seen that, by maintaining the DC level $\Delta V$ to "0" level, occurrence of steady phase error can be previously prevented at the deflection control circuit 24.

In an ordinary raster scanning, when the frequency of the horizontal synchronizing signal has changed, such steady phase error is changed in accordance with the change amount thereof and results in a shift in position in the horizontal direction of the display image.

Accordingly, in the conventional AFC circuit, the image center in the horizontal direction must be re-adjusted every time when a shift occurs in the horizontal synchronizing frequency. Particularly, in a bi-directional deflecting circuit, if the display images of forward path and backward path are displayed in a manner shifted in the opposite directions from each other due to such steady phase error, there is a disadvantage that the display image is displayed as an overlapped image or that, if the shift is relatively smaller, resolution thereof is degraded.

In this embodiment, however, a feedback loop is formed so as to maintain the DC level $\Delta V$ (i.e., corresponding to voltage V2 of the integrating result) to "0" level. Thus, occurrence of steady phase error can be previously prevented. Thereby, even when the horizontal synchronizing frequency has changed or, moreover, when the ambient temperature has changed, a shift in the image center of the display image can be prevented.

(2-3) Advantage of the Embodiment

According to the above construction: deflection of forward path and backward path is synchronized with the horizontal synchronizing signal HD at the deflection control circuit 22; deflection cycles of forward path and backward path are compared at the deflection control circuit 24; and, on the basis of such comparison result, the deflection cycles of forward path and backward path are maintained at a duty ratio of 50 [%]. Thus, an overlapped image or degradation in resolution of the display image can be prevented, thereby previously preventing degradation in picture quality of the display image.

Figure 13:
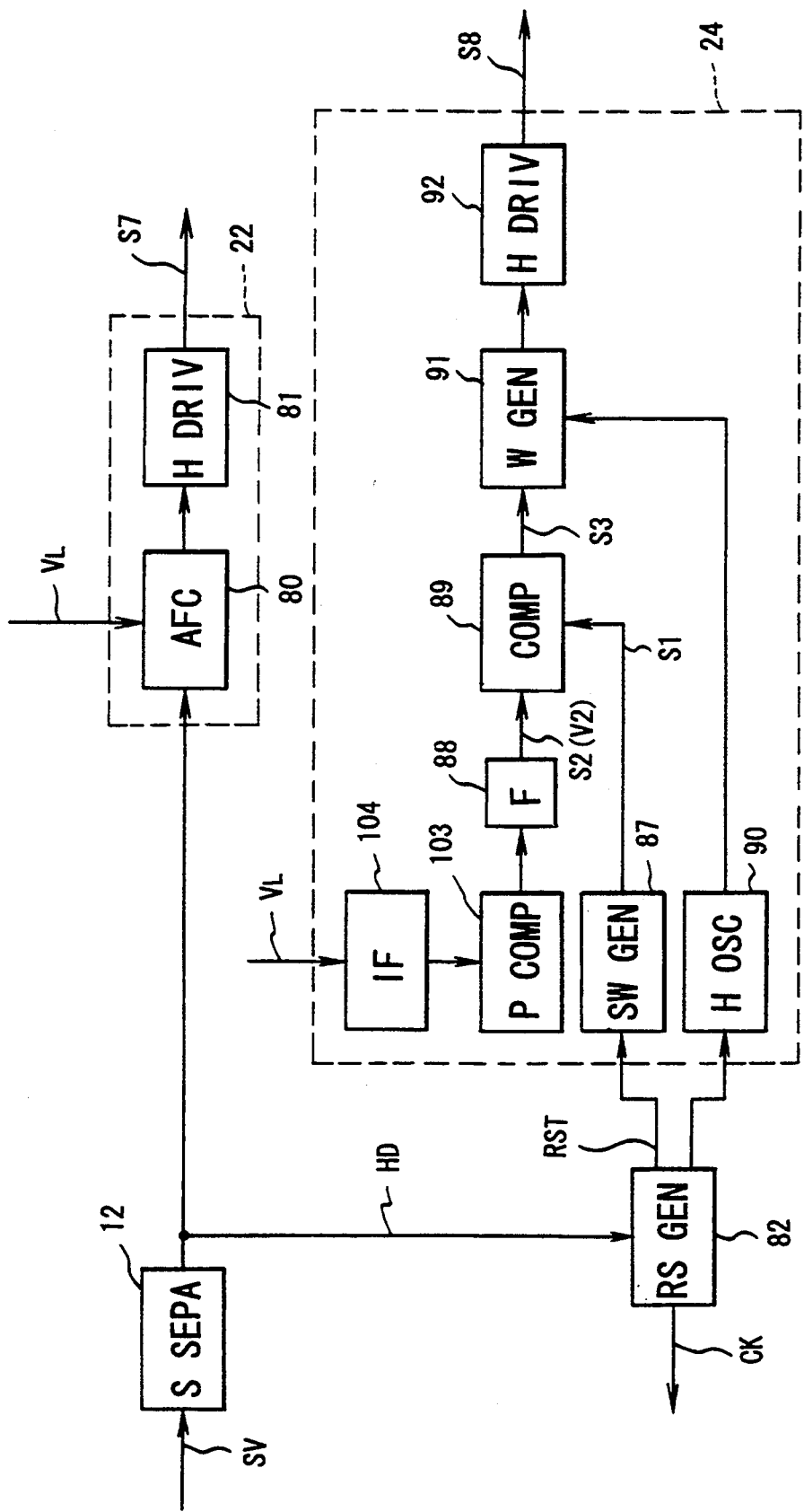
FIG. 13 is a block diagram showing other embodiment of deflection control circuit.

(2-4) Other Embodiment (2-4-1) As shown in FIG. 13, in this embodiment, the field-effect transistor Q2 is controlled by a deflection control circuit 24 instead of the deflection control circuit of FIG. 9.

Here, the deflection control circuit 24 supplies a deflection voltage $V_L$ to a phase comparison circuit 103 through an IF circuit 104 consisting of frequency divider and integrator circuits to compare the phase between the horizontal synchronizing signal HD and the deflection voltage $V_L$ at the phase comparison circuit 103.

The phase comparison circuit 103 is the same in construction as shown in FIG. 7.

The phase comparison circuit 103 inputs the deflection voltage $V_L$ (FIG. 8A) to the transistor Q9 through the IF circuit 104 and outputs a phase comparison result S4 from the collector side of the transistor Q9.

At this time, the phase comparison circuit 103 takes in the horizontal synchronizing signal HD in an inverted manner (FIG. 8B). On the basis of point in time of start of deflection of forward path determined by the horizontal synchronizing signal HD, it is thereby raised to its state of operation for a predetermined time period TH before and after such point in time.

Thereby, at the phase comparison circuit 103, in the time period TH, a phase comparison result S4 can be obtained, the signal level of which rises in synchronization with the horizontal synchronizing signal HD and then is inverted in polarity due to the rising of the deflection voltage $V_L$ and subsequently the signal level of the phase comparison result S4 is raised in synchronization with the horizontal synchronizing signal HD (FIG. 8C).

Accordingly, in the output signal S2 of the filter circuit 46A, the phase comparison result S4 can be integrated and outputted to obtain a detection voltage V2 the DC level of which as a whole varies in accordance with timing of rising of the deflection voltage $V_L$, for the time period TH during which the signal level of the horizontal synchronizing signal HD is raised (FIG. 8C).

The deflection control circuit 24 is thereby adapted to obtain the integration result of the deflection voltage $V_L$ by logging it for the time period TH which is determined by the horizontal synchronizing signal HD. The time period TH or the like is to be set so that the detection voltage V2 becomes 0 [V] when the deflection cycles of forward path and backward path are kept at a duty ratio of 50 [%].

Thereby, at the deflection control circuit 24, a comparison result between the sawtooth signal S1 and the detection voltage V2 can be obtained through the comparator circuit (FIG. 8D), to obtain drive signal S7 (FIG. 8E) for driving the field-effect transistor Q2.

At this time, at the deflection control circuit 24, by logging the deflection voltage $V_L$ for the time period TH which is determined by the horizontal synchronizing signal HD to obtain an integrating result thereof, it is possible to improve detection sensitivity of the detection voltage V2 with respect to change in the duty ratio. Thereby it is possible to prevent degradation in picture quality even more securely comparing to the case of the embodiment of FIG. 9.

According to the construction of FIG. 13, the deflection voltage $V_L$ is logged to obtain the integrating result thereof. By maintaining deflection cycles of forward path and backward path to the duty ratio of 50 [%] on the basis of such comparison result, it is possible to obtain a display image of even more higher quality comparing to the embodiment of FIG. 9.

(2-4-1) Noted that the embodiments discussed above have dealt with the case where deflections of forward path and backward path are switched at a period shorter than ½ period of the resonance frequency.

However, the present invention is not limited to this but, for example, it is also possible to provide a predetermined quiescent period to switch deflection of forward path and backward path and the length of such quiescent period at this time may be controlled to previously prevent a disagreement in display image.

(2-4-2) Further, in the above described embodiment, a description has been given with respect to a case where the field-effect transistors Q1 and Q2 are switched to their off state to alternately connect two resonance circuits so as to supply deflecting current of forward path and backward path to the horizontal deflecting coil L.

However, the present invention is not limited to this but, for example, it may be widely applied to bi-directional deflection circuits such a one disclosed in U.S. Pat. No. 5,051,668.

(2-5) As has been described, according to the present invention, timing of deflection of forward path or backward path is controlled so that it is synchronized with the horizontal synchronizing signal, and timing of deflection of backward path or forward path is controlled so that the deflection cycles of forward path and backward path equal to each other. Thereby, it is possible to obtain a deflecting circuit in which a display image synchronized with the horizontal synchronizing signal can be formed and degradation in picture quality can be previously prevented.

(3) THIRD EMBODIMENT (3-1) The bi-directional scan circuit of the third embodiment of this invention is generally constructed similarly to the one shown in FIG. 2 through FIGS. 8A to 8E except for the following differences.

In the case of the third embodiment, as shown in FIG. 6, the deflection control circuit 22 forms an APC (automatic phase control) circuit consisting of the phase comparison circuit 44A, the filter circuit 46A, the comparator circuit 48A and the horizontal oscillation circuit 50A, so as to keep at a certain value the relation in phase between the deflection for the backward path and the image signal on the basis of the horizontal synchronizing signal HD.

A horizontal oscillation circuit 50B also generates timing for switching the field-effect transistor Q2 to its on state on the basis of the output signal of the reference signal generation circuit 20.

In addition, the deflection control circuit 24 forms an APC circuit, in a similar manner to the deflection control circuit 22, by the phase comparison circuit 44B, the filter circuit 46B, the comparator circuit 48B and the horizontal oscillation circuit 50B, so as to keep at a constant value the relation in phase between the deflection of forward path and the image signal on the basis of the horizontal synchronizing signal HD.

Thereby, the deflection control circuits 22 and 24 generate display images of forward path and backward path such that the image center of the display image is the center of the display screen, so that the display position is not changed even when the frequency of the horizontal synchronizing signal HD is changed.

In this manner, at the deflection control circuit 22, a feedback loop is formed so as to make the change amount $\Delta V$ to 0 [V], whereby it is maintained so that a steady phase error does not occur at the phase comparison circuit 44A. Thereby, it is adapted to keep the relation in phase between the deflection of backward path and the image signal at a constant value on the basis of the horizontal synchronizing signal HD.

Furthermore, in this embodiment, as shown in FIG. 7, the reference power supply 72 is formed by a latch circuit for latching control data output from the system control circuit and a digital-to-analog conversion circuit for converting the output data of the latch circuit into an analog signal, thereby, the control data is switched at the system control circuit to adjust the voltage of the reference power supply 72.

Thereby, at the deflection control circuit 22, the position of the image center can be automatically adjusted with respect to the display image of forward path.

On the other hand, at the deflection control circuit 24 for controlling timing of forward path, the deflecting voltage $V_L$ is processed in a similar manner on the basis of the horizontal synchronizing signal HD, thereby setting the timing for switching the field-effect transistor Q2 to its off state.

Here, at the deflection control circuit 24, a feedback loop is formed similar to at the deflection control circuit 22 so as to make the change amount $\Delta V$ to 0 [V], to maintain so that a steady phase error does not occur at the phase comparison circuit 44B. Thereby, it is adapted to keep the relation in phase between the deflection of forward path and the image signal at a constant value on the basis of the horizontal synchronizing signal HD.

Further, at the deflection control circuit 24, by updating control data for adjusting the image center, the image center can be adjusted with respect to the display image of forward path following the adjustment of the image center of the deflection control circuit 22.

Thereby, at the display apparatus 1, the control data can be set to a predetermined value to automatically adjust the image center.

With the above construction of the third embodiment, timings of deflection for forward path and backward path are controlled so that, with respect to deflecting respectively forward path and backward path, the relation in phase between the image signal and the deflection takes a constant value on the basis of the horizontal synchronizing signal. Thus, occurrence of steady phase error in the phase comparison circuit can be previously prevented. Thereby, even when the frequency of the horizontal synchronization signal has changed, a horizontal shift in display image can be prevented.

(3-2) Other Embodiments (3-2-1) Note that the embodiments discussed above have dealt with the case where deflections of forward path and backward path are switched at a period shorter than ½ period of the resonance frequency.

However, the present invention is not limited to this but, for example, it is also possible to provide a predetermined quiescent period to switch deflection of forward path and backward path and the length of such quiescent period at this time may be controlled to previously prevent a disagreement in display image.

(3-2-2) Further, note that the embodiments discussed above have dealt with the case where the field-effect transistors Q1 and Q2 are switched to their off state to alternately connect two resonance circuits so as to supply deflection current of forward path and backward path to the horizontal deflecting coil L.

However, the present invention is not limited to this but, for example, it may be widely applied to bi-directional circuits such as one disclosed in U.S. Pat. No. 5,051,668.

(3-3) As has been described, according to the present invention, timing of deflection of forward path and backward path is respectively corrected so that the relation in phase between the image signal and the deflection takes a constant value on the basis of the horizontal synchronizing signal. Thus, even when the frequency of the horizontal synchronizing signal has changed, occurrence of steady phase error may be previously prevented and thereby a horizontal shift in display image may be prevented.

What is claimed is:

1. A bi-directional deflecting circuit for supplying a forward scan path and a backward scan path to a horizontal deflecting coil so as to form display images by deflecting respectively said forward scan path and said backward scan path, said deflecting circuit comprising:
   first and second timing control circuits for controlling respectively timings of deflection of said forward scan path and said backward scan path; and
   means for matching the display position of said display image between said forward scan path and said backward scan path.

2. A deflecting circuit according to claim 1, further comprising:
   a first resonance circuit for supplying said deflecting current of said forward scan path; and
   a second resonance circuit for supplying said deflecting current of said backward scan path: wherein
   said first and second phase control circuits;
   supply deflecting currents of said forward scan path and said backward scan path to said horizontal deflecting coil by changing over said first and second resonance circuits to be connected to said horizontal deflecting coil; and
   control timing of deflection of said forward scan path and said backward scan path by switching timing for changing over said first and second resonance circuits.

3. A deflecting circuit according to claim 1 or 2, wherein:
   said first and second timing control circuits control timings of deflection of said forward scan path and said backward scan path on the basis of the phase comparison results between the terminal voltage of said horizontal deflection coil and the horizontal synchronizing signal.

4. A deflecting circuit according to claim 1, claim 2, or claim 3, wherein:
   said first resonance circuit is composed of a series resonance circuit consisted of a first switching circuit, a resonance capacitor, said horizontal deflection coil and a first S-correction capacitor;
   said second resonance circuit is composed of a series resonance circuit consisted of a second switching circuit, said resonance capacitor, said horizontal deflecting coil, and a second S-correction capacitor; and
   said first and second timing control circuits complementarily switch said first and second switching circuit so as to control timing of the switching to control timings of deflection of said forward scan path and said backward scan path.

5. A bi-directional deflecting circuit according to claim 1, wherein said deflecting currents of forward scan path and said backward scan path supply to a horizontal deflecting coil so as to form display images by deflecting respectively said forward scan path and said backward scan path, said deflecting circuit further comprising:

a first timing control circuit for controlling timing of start of deflection of said forward scan path or said backward scan path so as to synchronize it with a horizontal synchronizing signal; and a second timing control circuit for obtaining a comparison result between the cycle of deflection of said forward scan path and the cycle of deflection of said backward scan path and for controlling timing of start of deflection of said backward scan path or said forward scan path on the basis of said comparison result.

6. A deflecting circuit according to claim 5, further comprising:

a first resonance circuit for supplying a deflecting current of said forward scan path; and a second resonance circuit for supplying a deflecting current of said backward scan path; wherein said first and second timing control circuits:

supply deflecting currents of said forward scan path and said backward scan path to said horizontal deflecting coil by changing over said first and second resonance circuits to be connected to said horizontal deflecting coil; and control timing of start of deflection of said forward scan path and said backward scan path by switching timing for changing over said first and second resonance circuits.

7. A deflecting circuit according to claim 5 or claim 6, wherein:

said second timing control circuit;

obtains a comparison result between the cycle of deflection of said forward scan path and the cycle of deflection of said backward scan path by integrating the terminal voltage of said horizontal deflecting coil and then obtaining a comparison result thereof with a sawtooth signal synchronized with said horizontal synchronizing signal;

and controls timing of start deflection of said backward scan path or said forward scan path so as to bring the comparison result to a predetermined level.

8. A deflecting circuit according to claim 7, wherein said second timing control circuit logs the terminal voltage of said horizontal deflecting coil to integrate it on the basis of said horizontal synchronizing signal.

9. A bi-directional deflecting circuit for supplying deflecting currents of forward scan path and backward scan path to a horizontal deflecting coil so as to form display images by deflecting respectively said forward scan path and said backward scan path, said deflecting circuit comprising:

a first phase control circuit for controlling timing of deflection of said forward scan path on the basis of a horizontal synchronizing signal to keep a constant relation in phase between an image signal forming a display image of said forward scan path and the phase of deflection of said forward scan path; and a second phase control circuit for controlling timing of deflection of said backward scan path on the basis of said horizontal synchronizing signal to keep a constant relation in phase between an image signal forming a display image of said backward scan path and the phase of deflection of said backward scan path and to keep the display image of said backward scan path in agreement with the display image of said forward scan path.

10. A deflecting circuit according to claim 9, wherein said first and second phase control circuits take in for a predetermined time period a terminal voltage of said horizontal deflecting coil on the basis of said horizontal synchronizing signal to obtain an integral result and control timings of start of deflection of said forward scan path and said backward scan path on the basis of the result of comparison between sawtooth signal generated on the basis of said horizontal synchronizing signal and said integral result.

11. A deflecting circuit according to claim 9 or 10, further comprising:

a first resonance circuit for supplying a deflecting current of said forward scan path; and a second resonance circuit for supplying a deflecting current of said backward scan path; wherein said first and second phase control circuits:

supply deflecting currents of said forward scan path and said backward scan path to said horizontal deflecting coil by changing over said first and second resonance circuits to be connected to said horizontal deflecting coil; and control timing of deflection of said forward scan path and said backward scan path by switching timing for changing over said first and second resonance circuits.

12. A deflecting circuit according to claim 9, 10 or 11, wherein:

said first resonance circuit is composed of a serial resonance circuit consisting of a first switch circuit, a resonance capacitor, said horizontal deflecting coil and a first S-correction capacitor;

said second resonance circuit is composed of a serial resonance circuit consisting of a second switch circuit, said resonance capacitor, said horizontal deflecting coil, and a second S-correction capacitor; and said first and second phase control circuits complementarily switch said first and second switch circuits so as to control timing of the switching control timings of deflection of said forward scan path and said backward scan path.

* * * * *